(12) United States Patent
Pomeroy et al.

(10) Patent No.: US 7,441,833 B1
(45) Date of Patent: Oct. 28, 2008

(54) ARRANGEMENT AND METHOD FOR CONVERTING OF SINGLE PANEL SUNROOFS INTO DOUBLE PANEL SUNROOFS AND COMPONENT PARTS THEREOF

(75) Inventors: Lisa Marie Pomeroy, Macomb, MI (US); Thomas Murray, Columbiaville, MI (US); Steven H. Klotz, Commerce Township, MI (US); Jean-Guy Cocaign, Rochester, MI (US); Anthony Joseph Samp, Troy, MI (US); Norman Russell Taylor, Oxford, MI (US); Julius Joseph Beregszaszy, III, Cadillac, MI (US); Michael Brett Healy, West Bloomfield, MI (US); Gregory L. Brown, Sterling Heights, MI (US)

(73) Assignee: Webasto Roof Systems, Inc., Rochester Hills, MI (US)

( * ) Notice: Subject to any disclaimer, the term of this patent is extended or adjusted under 35 U.S.C. 154(b) by 7 days.

(21) Appl. No.: 11/748,863

(22) Filed: May 15, 2007

(51) Int. Cl.
*B60J 7/00* (2006.01)
(52) U.S. Cl. .............. 296/216.06; 296/214; 296/216.01
(58) Field of Classification Search ............ 296/216.01, 296/214, 216.06
See application file for complete search history.

(56) References Cited

U.S. PATENT DOCUMENTS

| 4,699,421 | A | | 10/1987 | Schaetzler et al. |
| 5,104,178 | A | | 4/1992 | Bienert |
| 5,332,282 | A | * | 7/1994 | Maeda et al. ............... 296/213 |
| 6,467,837 | B1 | * | 10/2002 | Tolinski ................. 296/216.07 |
| 6,517,149 | B2 | | 2/2003 | Hirschvogel et al. |

OTHER PUBLICATIONS

Webasto® Hollandia 524 Grandview Article, 2004 Webasto Product North America, Inc., Apr. 2004, P/N 909078, one Page.

* cited by examiner

*Primary Examiner*—Dennis H Pedder
(74) *Attorney, Agent, or Firm*—David S. Safran

(57) ABSTRACT

An arrangement and process for conversion of a single panel sunroof into a two panel sunroof uses corner adaptor pieces with planar sides that form an outside corner and a concave inner contour extending between ends of the planar sides, the contour being matched to a rounded corner curvature of a cover panel of a single panel sunroof, such that two such cover panels having corner adaptor pieces thereon can seal relative to the roof opening and relative to each other within the roof opening. A roller blind assembly enables a roller blind to be added by the provision of track inserts for guiding of the roller blind during opening and closing thereof, each of the track inserts being attachable at an inner side of a respective guide track on the sunroof frame.

19 Claims, 8 Drawing Sheets

ARRANGEMENT AND METHOD FOR CONVERTING OF SINGLE PANEL SUNROOFS INTO DOUBLE PANEL SUNROOFS AND COMPONENT PARTS THEREOF

BACKGROUND OF THE INVENTION

1. Field of the Invention

The invention relates to sunroofs for motor vehicles. In particular, the invention relates to sunroofs of the type have a single movable roof panel and those having a pair of roof panels, one of which is movable.

2. Description of Related Art

Sunroofs are very common on motor vehicles, especially on automobiles. A common type of single panel sunroof is the tilt-slide type in which the cover panel can either be lifted at a rear edge into an inclined ventilation position or it can be slid back under the rear area of the fixed vehicle roof. Examples of two of the many versions of such sunroofs can be found in U.S. Pat. Nos. 4,699,421 and 5,104,178.

More recently, double panel sunroofs have come into use in order to enable more fresh air and/or more light to enter the motor vehicle. U.S. Pat. No. 6,517,149 shows one example of such a roof, and the Webasto® Hollandia 524 GrandView is another example of such a roof.

While the consumer benefits from an increased selection of available types of sunroofs, the manufacturer or installed faces the problem of having to carry a larger inventory of parts, which means an increase in up-front expenses and an increased storage space requirement.

SUMMARY OF THE INVENTION

Therefore, the present invention was developed with the goal of reducing the above noted problem associated with offering of single panel and double panel sunroofs. Accordingly, a primary object of the present invention is devise a means by which many of the component associated with a single panel sunroof can be adapted for use in a double panel sunroof.

The above object is achieved by providing components that can be used to enable two covers of the type used for a single panel sunroof to be used in a double panel sunroof.

The above object is achieved by providing components by which the guide tracks of a single panel sunroof can be modified for use in a double panel sunroof.

Another manner in which the above object is achieved is by providing components with which a roller shade option can be provided on a converted double panel sunroof.

These and other objects, features and advantages of the present invention will become apparent from the following detailed description of preferred embodiments when viewed in conjunction with the accompanying drawings.

DETAILED DESCRIPTION OF THE INVENTION

While the invention is described below with regard to conversion of a sunroof having a frame of the type shown in the above-mentioned U.S. Pat. No. 5,104,178, the invention is not intended to be limited to use in connection with such a sunroof. To the contrary, the concepts described below will be applicable to most, if not all, single panel sunroofs.

Figure 1:
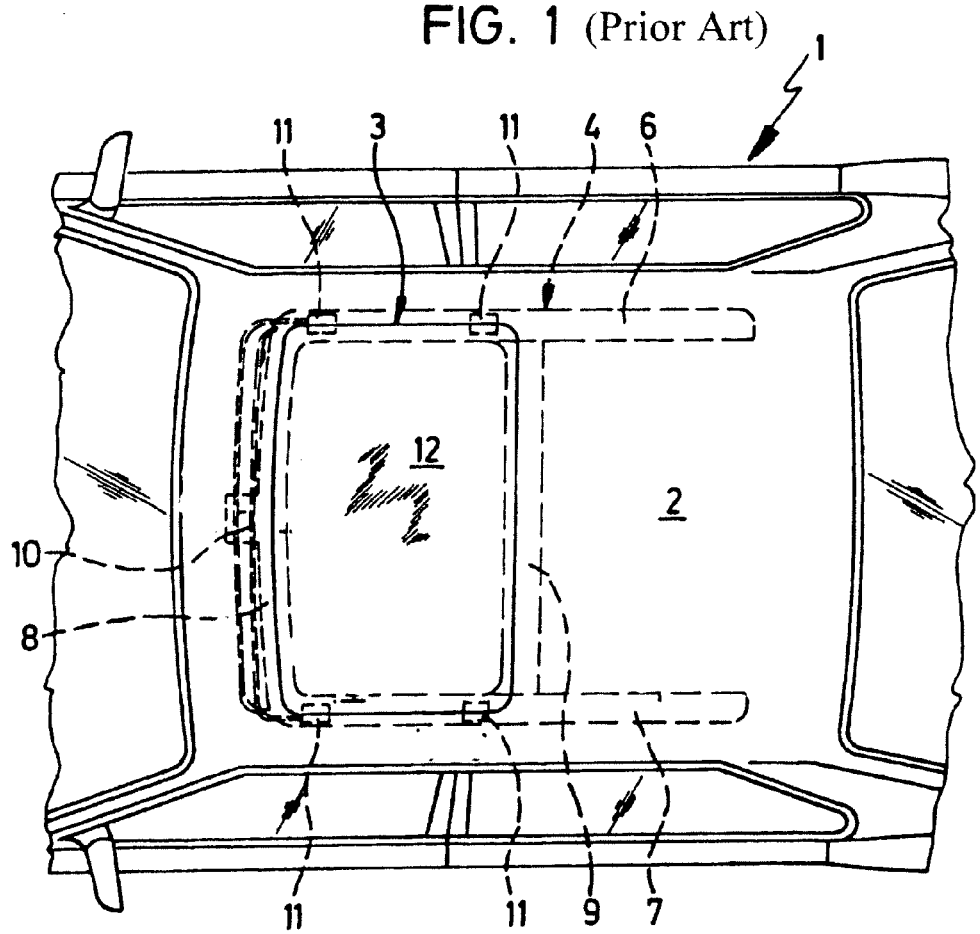
FIG. 1 shows a single panel sunroof as known from U.S. Pat. No. 5,104,178 installed in a motor vehicle.

FIG. 1 shows a top view of a known single panel vehicle roof 1 which has a fixed roof surface 2 and a sliding roof or a sliding and lifting roof 3. The sliding roof or sliding and lifting roof comprises a frame 4 which is inserted into a roof opening in the fixed roof surface 2. The frame 4 comprises two lateral side parts 6, 7, which are arranged parallel to the longitudinal axis of the vehicle, at a distance from each other, as well as a front part 8 and at least one cross member 9. The front part 8 is provided a drive unit 10, such as an electric motor, having a pinion gear, or the like, for powering pressure-resistant drive cables which are connected with guide members 11 and are guided at front part 8 and at side parts 6 and 7. A cover 12 is supported on guide members 11 so as to be displaceably guided along side parts 6 and 7 in the longitudinal direction of the vehicle from its illustrated closed position to a position in which it at least partially exposes roof opening 5, and/or cover 12 can be pivoted, such that its rear end projects at an angle above the fixed roof surface 2 at the rear area, thereby creating a vent opening. The specific means by which such motions are obtainable are well known in the art and thus, need not be described here. This known sunroof is also provided with a drain channel member 14, a wind deflector 16, and a sunshade headliner 18 that is slidable in tracks provided on the side parts 6, 7 for controlling the entry of light through the transparent or translucent cover panel that is made of a plastic or glass material.

As can be seen from FIG. 1, the side parts 6, 7 extend under the fixed roof surface by a distance that is at least as great as the front-to-back dimension of the cover 12. This is a characteristic found in other sliding-lifting roofs as well. Thus, vehicles capable of receiving such roofs are capable of receiving sunroofs with two sunroof panels as well. However, as noted initially, to provide an increased selection of available types of sunroofs, up to now has meant that the manufacturer or installer to carry a larger inventory of parts, with an associated an increase in up-front expenses and an increased storage space requirement. Merely enlarging the roof opening and adding a second cover panel, either specially designed or a duplicate of the single panel could not be done because the round corners of the cover of a single panel sunroof will leave gaps relative to the frame and a second cover that form leakage openings. Furthermore, the sliding sunshade headliner of a single panel sunroof cannot be used in a double panel sunroof. The present invention overcomes these problems in the manners described in detail below.

Figure 4:
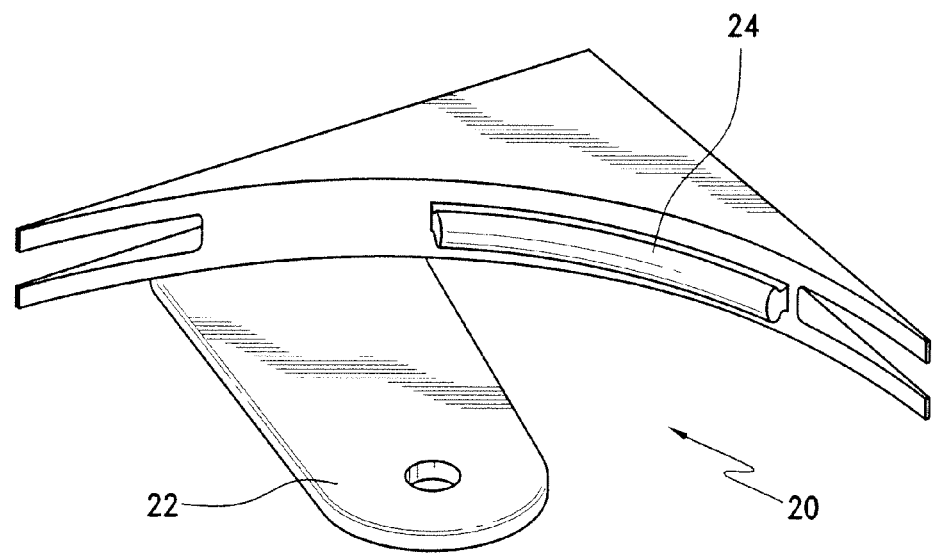
FIGS. 4 & 5 are top and bottom perspective views, respectively, of a square corner add-on piece in accordance with an embodiment of the invention.
Figure 5:
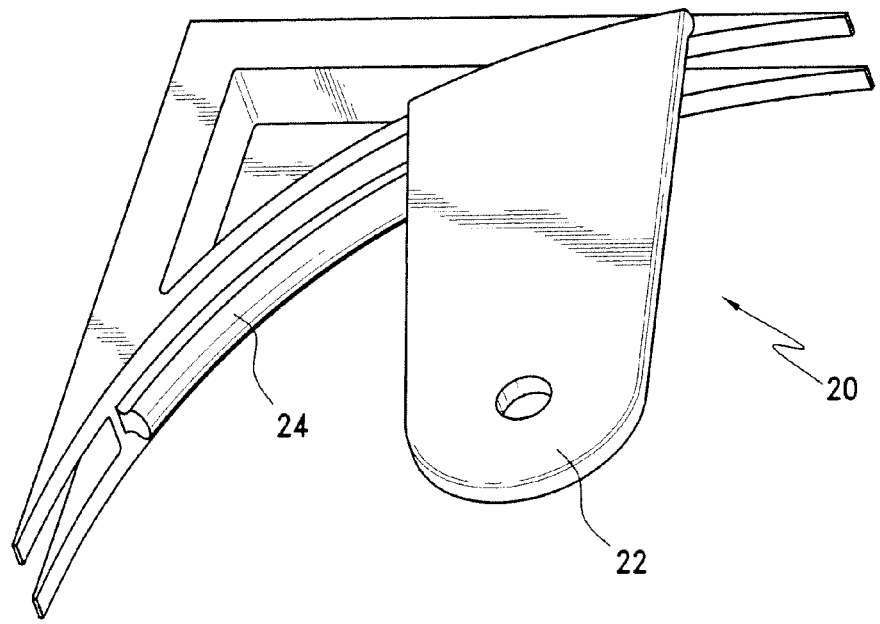

A first element provided in accordance with the present invention for enabling conversion of a single panel sunroof into a two panel sunroof, are corner adaptor pieces 20 that have planar sides which form an outside corner and a concave inner contour extending between ends of the planar sides. The concave contour is matched to rounded corner curvature of the cover panel 12 of a single panel sunroof that is to be used in the converted sunroof. One example of such corner adaptor pieces 20 is shown in FIGS. 4 & 5. The corner adaptor pieces shown have an attachment bracket 22 which has an opening for an attachment screw, but which can be affixed to the panel by glue or other means instead. Furthermore, since the cover panel 12 normally has a peripheral groove for receiving an edge seal, the corner adaptor pieces 20 can have a similarly shaped bead 24 which can engage in the seal-receiving groove of the panel being converted. Since the edge seal will now need to go around the corner adaptor pieces 20 as well as the cover panel 12, the corner adaptor pieces 20 have a seal-receiving groove 26 which will align with the seal-receiving grooves in straight side portions of the cover panel 12 to each side of it.

Figure 6:
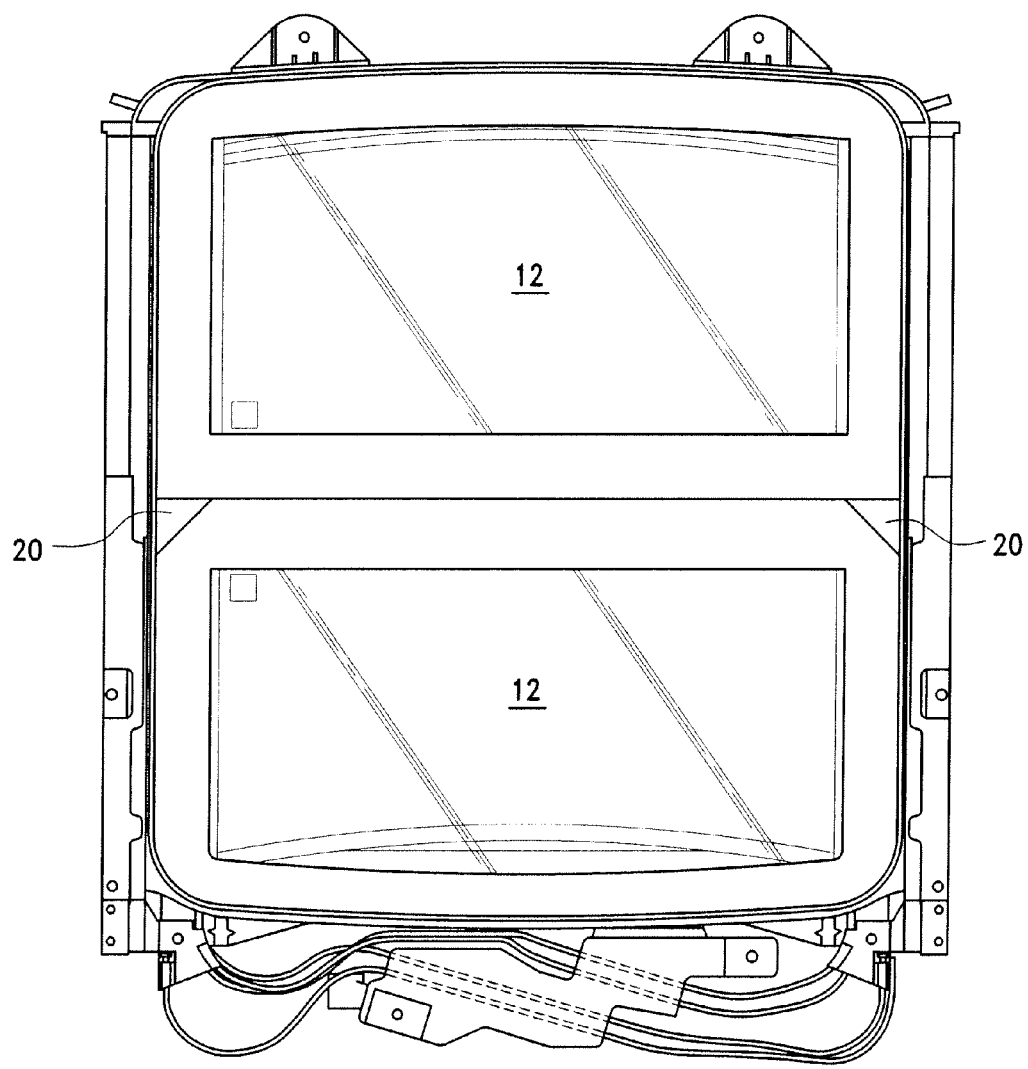
FIGS. 6 & 7 are plan views showing two different manner of using the added on piece of FIGS. 3 & 4 for adapting covers of a single panel sunroof for use in a double panel sunroof.
Figure 7:
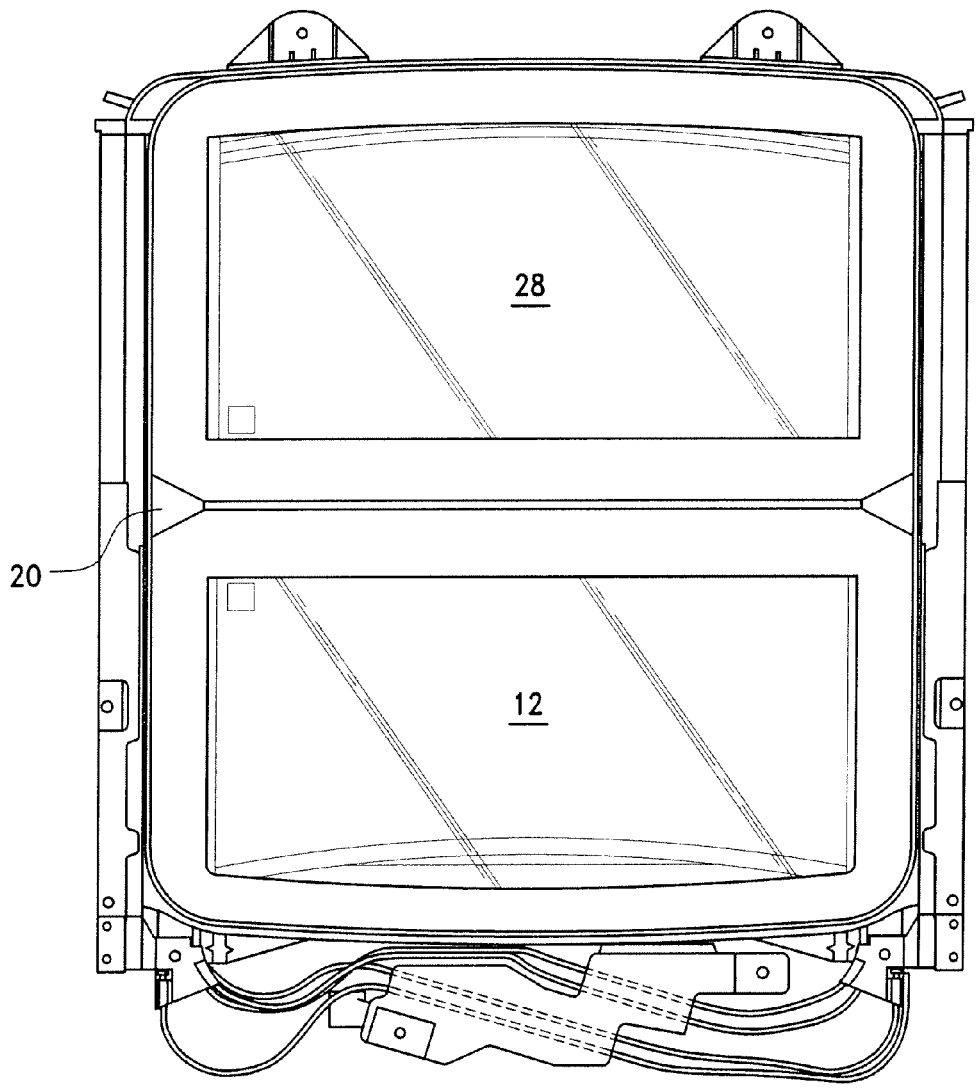

FIG. 6 shows two cover panels 12 having corner adaptor pieces 20 installed on each of the two facing corners so that they can form a continuous periphery that can seal relative to the roof opening (which is enlarged relative to that shown in FIG. 1) and are also able to seal relative to each other within the roof opening in their closed position. Alternatively, as shown in FIG. 7, it is also possible to convert only the existing single panel of the single cover panel roof being converted and to pair it with a specially designed cover 28 which has been manufactured to mate with a converted cover having a corner adaptor piece 20 at each of the facing corners. In the case of using a specially designed cover 28, it is possible to form the corner adapter pieces as contour projections formed as part of the specially designed cover 28, thereby allowing the existing cover panel 12 to be used in unmodified form.

Figure 9:
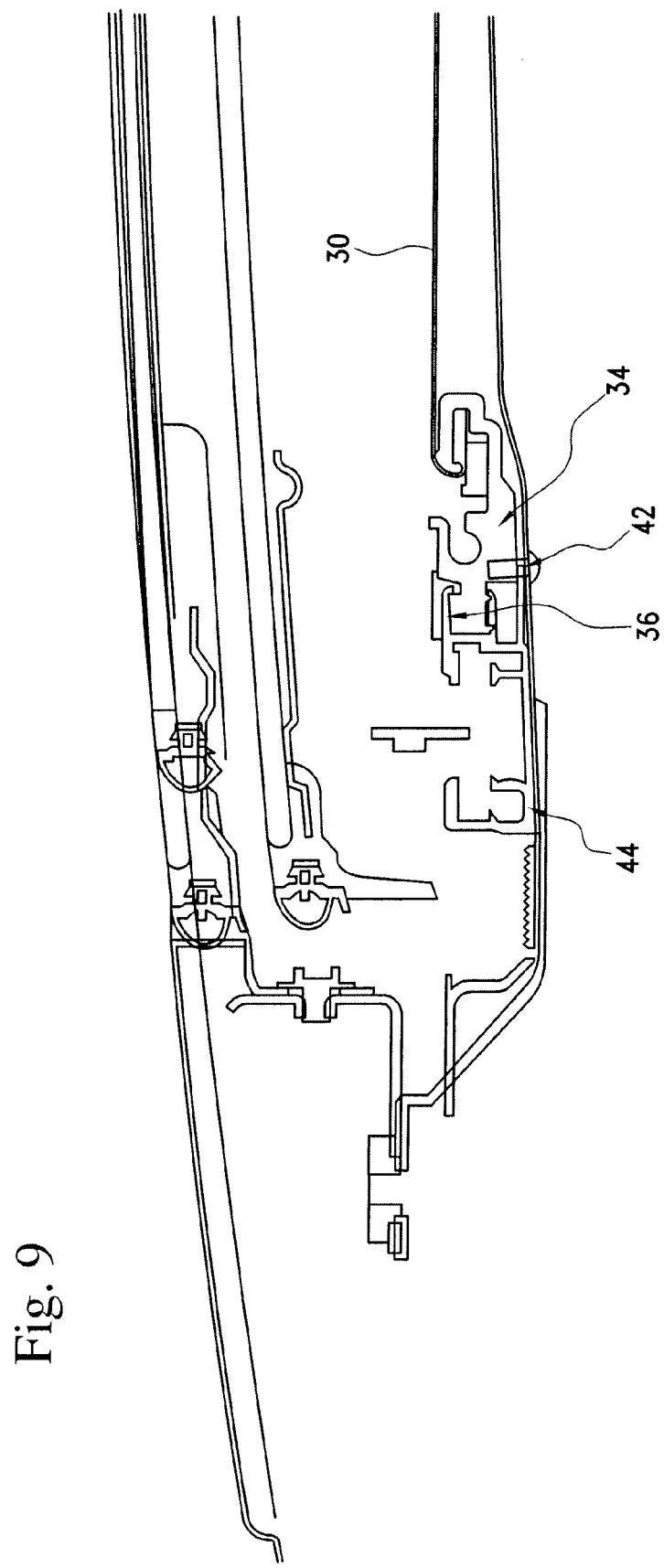

Without adding of an additional motor and drive elements, the rear one of the panels would be a fixed translucent or transparent cover panel and the front cover panel would remain a sliding and lifting cover panel that is able to be raised into an upwardly inclined ventilation position or slid-back under the fixed rear panel (as represented in FIG. 9) using the existing motor and drive components of the single panel roof being converted. However, by providing a lifting mechanism and additional motor, the rear panel could be made as a lifting roof, the rear edge of which can be swung upward into a ventilating position.

Figure 3:
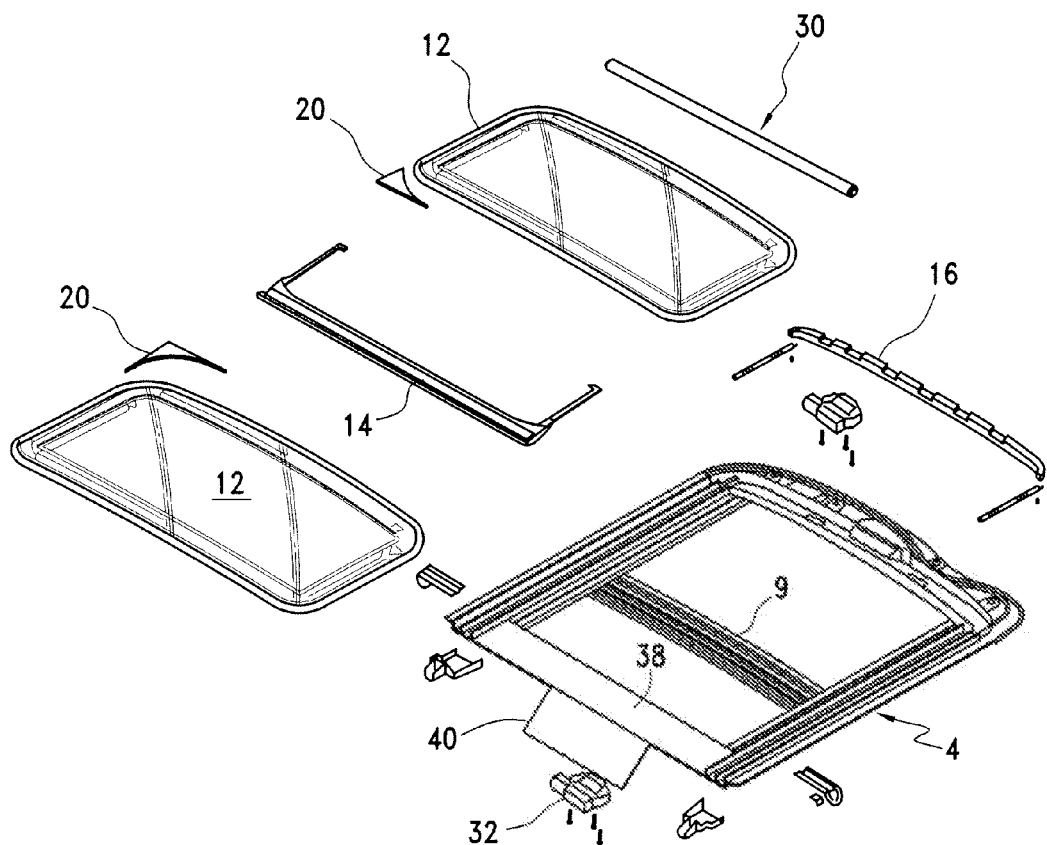
FIG. 3 is the exploded view of FIG. 2, but with the conversion parts of the invention shown.

As mentioned above, the existing sliding sunshade headliner of the single panel sunroof cannot be used in the converted sunroof. Thus, in order to provide the function provided by the sliding sunshade headliner 18, the present invention provides a means to adapt the converted roof to have a roller blind 30 (schematically represented in FIG. 3). To this end, the arrangement of the present invention provides a roller blind assembly having the roller blind 30, preferably, a motor drive having a drive motor 32 (although a manually operable roller blind could be used instead) and track inserts 34 mounting and for guiding of the roller blind 30 during opening/extending and closing/retracting thereof.

Figure 2:
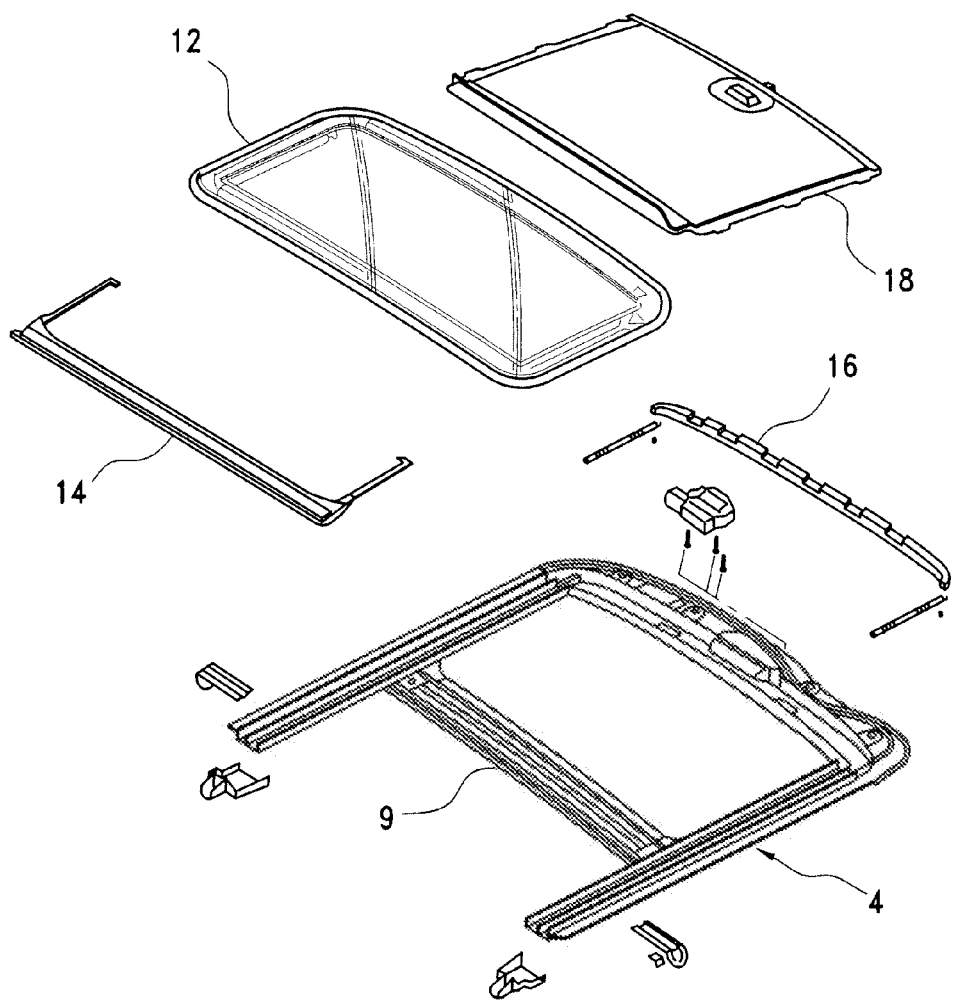
FIG. 2 is an exploded view of a single panel sliding and lifting sunroof module.

Each of the track inserts 34 is adapted for attachment at an inner side of a respective guide track 36 that originally served for guidance of the sunshade headliner 18. The track inserts provide a rotational mount for the roller blind 30 at an entrance end into the guide path formed in the track inserts, ends of the leading edge of the blind being connected by drive cables to the drive motor 32 which supported on a motor bracket for attachment to the frame of a sunroof being converted. In the case of a sunroof as shown in FIGS. 1 & 2 in which the frame is generally U-shaped with two lateral side parts 6, 7, with free end portions, a reinforcement cross member 38 is advantageously provided for connecting the free end portions at opposite sides of the frame, in which case the motor bracket 40 is preferably integrated with or mounted on the reinforcement cross member. 38. In the case of a sunroof that has a circumferentially continuous frame the motor bracket 40 or the motor 32, itself, can be mounted directly to the frame.

Figure 8:
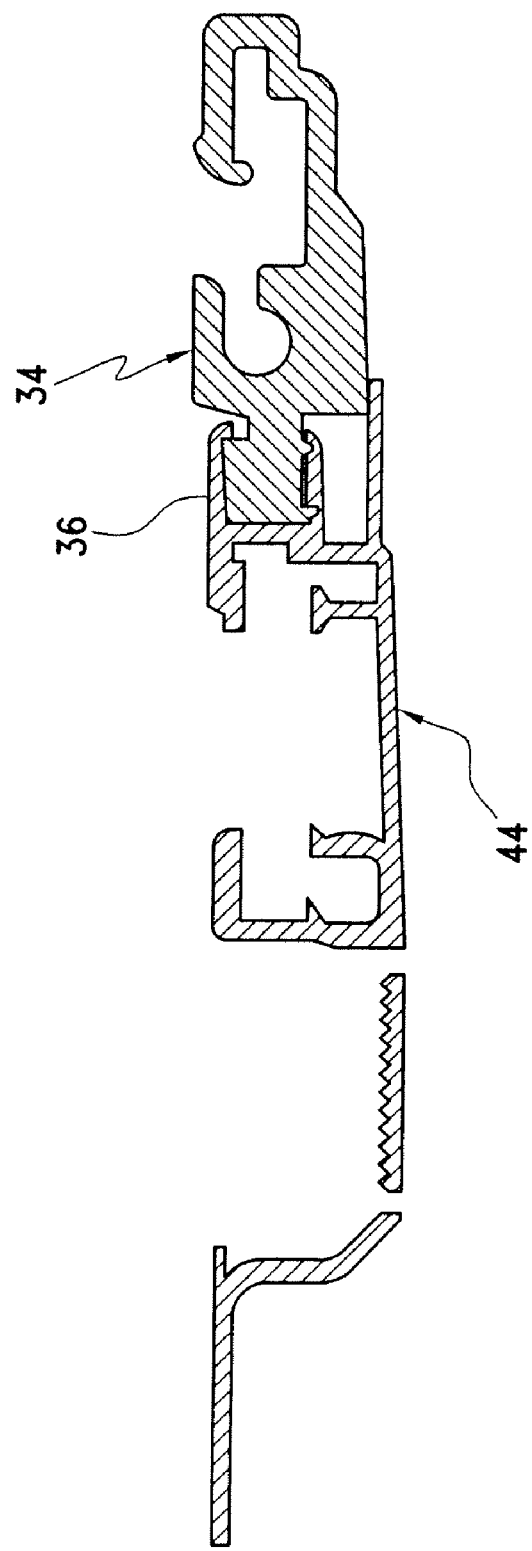
FIGS. 8 & 9 are cross-sectional views showing two different manners of adding a roller blind guide track to a roof guide track in accordance with the invention.

FIG. 8 shows a roller blind track insert 34 that is designed to snap into the sunshade headliner guide track 36 of the existing guide 44 of the sunnroof being converted. On the other hand, FIG. 9 shows a roller blind track insert 34 that is designed to be attached to the sunshade headliner track of the existing guide of the sunnroof being converted by fasteners 42, such as, screws, rivets, etc. (a self-tapping screw being represented in FIG. 9) which pass through the lateral side parts 6, 7, and engage the track inserts 34.

For conversion of a single panel sunroof into a two panel sunroof using the above described components, after selecting a single panel sunroof to be converted, at least its cover panel having rounded corners has adaptor pieces 20 applied to two of the rounded corners of the cover panel 12 (or in the case of cover panels for single panel sunroofs being utilized, both panels have adaptor pieces 20 applied to two of the rounded corners) so that the two cover panels can seal relative to a roof opening and relative to each other each other within the roof opening when installed. The two cover panels are mounted to the frame of a sunroof being converted such that at least one of the cover panels 12 is movable between an open position and a closed position.

Furthermore, if a roller blind assembly is to be provided, a roller blind 30 and track inserts 34 for guiding of the roller blind during opening and closing thereof are attached in a respective guide track 36 of the frame 4 of the sunroof being converted which were provided for a sunshade headliner 18 in the single panel sunroof, either by a snap-in connection or using fasteners. If the roller blind is to be motor driven, a motor bracket 40 is attached to the frame of the sunroof being converted and guide cables connected in a conventional manner to the motor 32 and the roller blind 30 for extending and retracting of the roller blind. If the frame is of the U-shaped type described above, a reinforcement cross member 38 is connected between opposite sides 6, 7 of the frame 4 of the sunroof being converted and the motor bracket 40 integrated with or mounted on the reinforcement cross member 38.

As will be appreciated by those skilled in the art, the concepts described above will be applicable to most, if not all, single panel sunroofs for enabling conversion to a double panel sunroof, with modifications in configuration, manner of attachment, etc. appropriate for adaptation to any particular roof. Thus, the present invention is not intended to be limited to the particular features described, but rather is intended to encompass the full scope of the appended claims.

What is claimed is:

1. An arrangement for conversion of a single panel sunroof into a two panel sunroof, comprising corner adaptor pieces having planar sides forming an outside corner and a concave inner contour extending between ends of the planar sides, said contour being matched to a rounded corner curvature of a cover panel of a single panel sunroof, such that said cover panel having said corner adaptor pieces thereon can seal relative to the roof opening and relative to a second cover panel within the roof opening.

2. The arrangement according to claim 1, further comprising a roller blind assembly having a roller blind and track inserts for guiding of the roller blind during opening and closing thereof, each of said track inserts being adapted for attachment at an inner side of a respective guide track.

3. The arrangement according to claim 2, wherein said roller blind assembly further comprises a motor bracket for attachment to a frame of a sunroof being converted, in use, and a motor for extending of the roller blind, in use, said motor being mountable on the motor bracket.

4. The arrangement according to claim 3, further comprising a reinforcement cross member for connecting opposite sides of the frame of the sunroof being converted, and wherein said motor bracket is integrated with or mounted on said reinforcement cross member.

5. The arrangement according to claim 1, further comprising attachment brackets for the roller blind that are mountable on the frame or are integrated with the reinforcement cross member.

6. The arrangement according to claim 1, further comprising a reinforcement cross member for connecting opposite sides of the frame of the sunroof being converted.

7. Process for conversion of a single panel sunroof into a two panel sunroof, comprising the steps of:
 selecting a single panel sunroof having a cover panel with rounded corners sunroof for conversion into a two panel sunroof and providing a second cover panel;
 applying corner adaptor pieces having planar sides forming an outside corner and a concave inner contour extending between ends of the planar sides to two of the rounded corners of at least the cover panel of the sunroof selected for conversion so that the cover panels, with said corner adaptor pieces, can seal relative to a roof opening and relative to each other each other within the roof opening; and
 mounting said cover panels to a frame of the sunroof being converted such that at least one of the cover panels is movable between an open position and a closed position.

8. Process according to claim 7, further comprising the further step of adding a roller blind assembly having a roller blind and track inserts for guiding of the roller blind during opening and closing thereof by attaching each of said track inserts at an inner side of a respective guide track of the frame of the sunroof being converted.

9. Process according to claim 8, comprising the further step of attaching a motor bracket to the frame of the sunroof being converted and attaching a motor for extending and retracting of the roller blind on the motor bracket.

10. Process according to claim 9, further comprising the step of mounting a reinforcement cross member connecting opposite sides of the frame of the sunroof being converted, and wherein said motor bracket is integrated with or mounted on said reinforcement cross member.

11. Process according to claim 8, wherein said attaching of the track inserts is performed by a snap-in connection between the inserts and sunshade headliner tracks at the inner sides of the guide tracks.

12. Process according to claim 8, wherein said attaching of the track inserts is performed using fasteners which engage in the guide tracks.

13. Process according to claim 7, wherein the frame of the sunroof being converted has a generally U-shape with free end portions at opposite sides of the frame, and further comprising the step of attaching a reinforcement cross member connecting the free end portions.

14. The process according to claim 7, wherein the second cover panel also has rounded corners and wherein corner adaptor pieces having planar sides forming an outside corner and a concave inner contour extending between ends of the planar sides is also applied to two of the rounded corners of the second cover panel in said step of applying corner adaptor pieces.

15. A two panel sunroof produced by the process of claim 14.

16. A two panel sunroof produced by the process of claim 7.

17. A two panel sunroof produced by the process of claim 8.

18. A two panel sunroof produced by the process of claim 10.

19. A two panel sunroof produced by the process of claim 13.

* * * * *